US012521691B2

(12) United States Patent
Kaiser et al.

(10) Patent No.: US 12,521,691 B2
(45) Date of Patent: Jan. 13, 2026

(54) PRODUCT GAS MANIFOLD SYSTEM FOR A STEAM REFORMER

(71) Applicant: L'Air Liquide, Société Anonyme pour l'Etude et l'Exploitation des Procédés Georges Claude, Paris (FR)

(72) Inventors: Tobias Kaiser, Reichelsheim (DE); Antonio Coscia, Hadamar (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 862 days.

(21) Appl. No.: 17/836,200

(22) Filed: Jun. 9, 2022

(65) Prior Publication Data
US 2022/0395804 A1    Dec. 15, 2022

(30) Foreign Application Priority Data

Jun. 11, 2021 (EP) .................................. 21020304

(51) Int. Cl.
*B01J 19/24* (2006.01)
*B01J 12/00* (2006.01)
(Continued)

(52) U.S. Cl.
CPC ........... *B01J 19/2425* (2013.01); *B01J 12/00* (2013.01); *B01J 19/0013* (2013.01); *C01B 3/34* (2013.01);
(Continued)

(58) Field of Classification Search
CPC ..... B01J 8/00; B01J 8/001; B01J 8/008; B01J 8/06; B01J 8/062; B01J 8/067; B01J 12/00; B01J 19/00; B01J 19/0006; B01J 19/0013; B01J 19/24; B01J 19/2415; B01J 19/2425; B01J 19/32; B01J 2208/00; B01J 2208/00008; B01J 2208/00017;
(Continued)

(56) References Cited

U.S. PATENT DOCUMENTS

| 6,099,922 A | 8/2000 | Boll et al. |
| 2004/0037760 A1 | 2/2004 | Fell |
| 2018/0361337 A1* | 12/2018 | Coscia .................... B01J 4/001 |

FOREIGN PATENT DOCUMENTS

| DE | 10 2006 022898 | 9/2007 |
| EP | 0 799 639 | 10/1997 |

(Continued)

OTHER PUBLICATIONS

International Search Report and Written Opinion for corresponding EP 21020304, Oct. 18, 2021.

*Primary Examiner* — Natasha E Young
(74) *Attorney, Agent, or Firm* — Elwood L. Haynes

(57) ABSTRACT

A product gas manifold system for a steam reformer is provided. The product gas manifold system includes a product gas manifold including an outer jacket tube and a gas-conveying inner tube extending concentrically and coaxially over its entire length, a space between the inner and jacket tubes being at least partially filled with a first insulating material, a plurality of nozzle tubes, each for connecting a reformer tube to the product gas manifold, a second insulating material disposed around the jacket tube, a curved outer surface outwardly limiting the second layer of the second insulating material and following the shape of the jacket tube in the axial direction.

18 Claims, 4 Drawing Sheets

(51) Int. Cl.
*B01J 19/00* (2006.01)
*C01B 3/34* (2006.01)

(52) U.S. Cl.
CPC .......... *B01J 2219/00155* (2013.01); *B01J 2219/00157* (2013.01); *C01B 2203/0233* (2013.01); *C01B 2203/0811* (2013.01); *C01B 2203/1241* (2013.01)

(58) Field of Classification Search
CPC .... B01J 2208/00106; B01J 2208/00168; B01J 2208/00194; B01J 2208/00212; B01J 2208/06; B01J 2208/065; B01J 2219/00; B01J 2219/00049; B01J 2219/00051; B01J 2219/0015; B01J 2219/00155; B01J 2219/00157; C01B 3/00; C01B 3/02; C01B 3/32; C01B 3/34; C01B 3/38; C01B 3/384; C01B 2203/00; C01B 2203/02; C01B 2203/0205; C01B 2203/0227; C01B 2203/0233; C01B 2203/08; C01B 2203/0805; C01B 2203/0811; C01B 2203/12; C01B 2203/1205; C01B 2203/1211; C01B 2203/1235; C01B 2203/1241; F16L 59/00; F16L 59/14
See application file for complete search history.

(56) References Cited

FOREIGN PATENT DOCUMENTS

| | | |
|---|---|---|
| EP | 2 767 335 | 8/2014 |
| WO | WO 2017 102093 | 6/2017 |

* cited by examiner

PRODUCT GAS MANIFOLD SYSTEM FOR A STEAM REFORMER

CROSS REFERENCE TO RELATED APPLICATIONS

This application claims the benefit of priority under 35 U.S.C. § 119 (a) and (b) to European Patent Application No. EP 21020304.8, filed Jun. 11, 2021, the entire contents of which are incorporated herein by reference.

TECHNICAL FIELD

The present disclosure relates generally to a product gas collecting system; more specifically, the present disclosure relates to a product gas manifold system for a steam reformer, comprising a plurality of reaction tubes within a reformer housing, for producing synthesis gas.

BACKGROUND

Generally, product gas collecting systems are configured to take up hot synthesis gases provided from reaction tubes, wherein the gases are at a temperature of 900° C. and at a high pressure of, for example, 30 bar. Moreover, the product gas collecting systems are configured to discharge the gases for further treatment, in particular for recovering heat energy contained in the gases. Since the collecting systems are deployed outdoors, they are constructed to include a jacket tube and a concentric inner tube with an interposed insulating layer, so as not to dissipate an unnecessary amount of heat to ambient air surrounding the collecting systems. In operation of such a reformer, a temperature of the jacket tube on the one hand should be high enough to exclude safely a formation of corrosive condensates in the insulating layer and in particular on an inner wall of the jacket tube, and on the other hand the temperature should not be so high that steel material of the jacket tube is weakened. This is why the insulating layer disposed between inner tube and jacket tube is designed such that, when in operation, an operating temperature of the jacket tube approximately lies in a range of 150° C. to 200° C., and an outer insulation of the collecting conduits is omitted completely.

A particular problem that is encountered in setting a temperature to be as uniform as possible on an entire circumference of the jacket tube, in order to avoid mutually different thermal expansions in the jacket tube and hence a distortion of the collecting system along its length. However, this objective is difficult to achieve, as an upper side of the collecting system is exposed to radiative heat emitted by the reformer bottom and in addition receives an inflow of heat via ports of the collecting system connected with hot reformer tubes. The drawing of the European Patent EP 0 799 639 A1 is an illustration of a frequently used implementation of such port. When viewing the drawing, the skilled person would appreciate how heat is transmitted from the hot, gas-carrying inner port tube to the jacket tube of the port and on to the jacket tube of the collecting system. In contrast thereto, the bottom sides of the collecting system are merely exposed to wind and draft. In general, this leads to the temperature of the upper side being higher than that of the bottom side, which leads to a greater thermal expansion of the upper side and hence to bending of the collecting system.

A conceivable countermeasure might consist in designing the internal insulating layer of the collecting system with heat transfer coefficients varying over the circumference, as it is proposed in the German patent DE 10 2006 022 898 B3. In this way, an amount of heat transmitted from the hot gas flowing in the inner tube through the internal insulation to the jacket tube can be set to vary over the tube circumference, such that the aforesaid external influences are compensated. However, the technical realization of such an insulating layer is expensive.

Therefore, there is a need to address the aforementioned technical drawbacks in existing technologies to provide a less expensive and an efficient product gas collection system.

SUMMARY

The present disclosure seeks to provide an improved product gas manifold system for a steam reformer. An aim of the present disclosure is to provide an economic and technically uncomplicated solution that overcomes at least partially the problems encountered in the prior art to achieve a more uniform jacket temperature of a product gas manifold system and reduce tensions in a jacket tube which are caused by a temperature difference. The product gas manifold system according to the invention can withstand both internal influences such as temperature differences and external influences such as climatic conditions, thereby increasing a life and efficiency of the product gas manifold system. The object of the present disclosure is achieved by solutions defined in independent claims as included below. Advantageous implementations of the present disclosure are further defined in the dependent claims.

According to a first aspect, the present disclosure provides a product gas manifold system for a steam reformer, wherein the steam reformer includes a plurality of reformer tubes within a reformer furnace, and wherein the product gas manifold system comprises: (a) a product gas manifold for a synthesis gas produced by steam reforming, arranged outside the reformer furnace and exposed to ambient environment, comprising an outer jacket tube and a gas-conveying inner tube extending concentrically and coaxially over its entire length, the space between the inner tube and the jacket tube being at least partially filled with a first layer of a first insulating material, (b) a plurality of nozzle tubes arranged along the length of the product gas manifold, each for connecting a reformer tube to the product gas manifold in such a manner that a fluid connection exists between the gas-conveying inner tube and the reformer tube connected thereto, (c) a second layer of a second insulating material disposed around the jacket tube over at least a portion of its circumference and over at least a portion of its length, (d) a curved outer surface outwardly limiting the second layer of the second insulating material, wherein (e) the curved outer surface has a circular arc-shaped or U-shaped profile in the radial direction, open in the direction of the reformer furnace, and following the shape of the jacket tube in the axial direction.

The product gas manifold system according to the present disclosure enables an efficient collection of hot synthesis gas from the steam reformer to be achieved by using a safe and a cost-effective arrangement. The product gas manifold system includes an insulating arrangement for achieving a more uniform jacket temperature, thereby reducing tensions in the jacket tube which are caused by temperature differences. The product gas manifold system can withstand both internal influences such as temperature differences and external influences such as climatic conditions, thereby increasing the life and efficiency of the product gas manifold system. The product gas manifold system avoids different thermal expansions, thereby preventing distortion of the product gas manifold system along its length.

Embodiments of the present disclosure eliminate the aforementioned drawbacks in existing known approaches for collecting hot synthesis gas from steam reformers. The advantage of the embodiments according to the present disclosure is that the embodiments enable a more uniform jacket temperature of the product gas manifold system to be achieved, and tensions in the jacket tube which are caused by temperature differences to be reduced. Additional aspects, advantages, features and objects of the present disclosure are made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. To illustrate the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, the same elements have been indicated by identical numbers. Embodiments of the present disclosure will now be described, by way of example only, with reference to the following diagrams wherein.

DETAILED DESCRIPTION OF PREFERRED EMBODIMENTS

Figure 1:
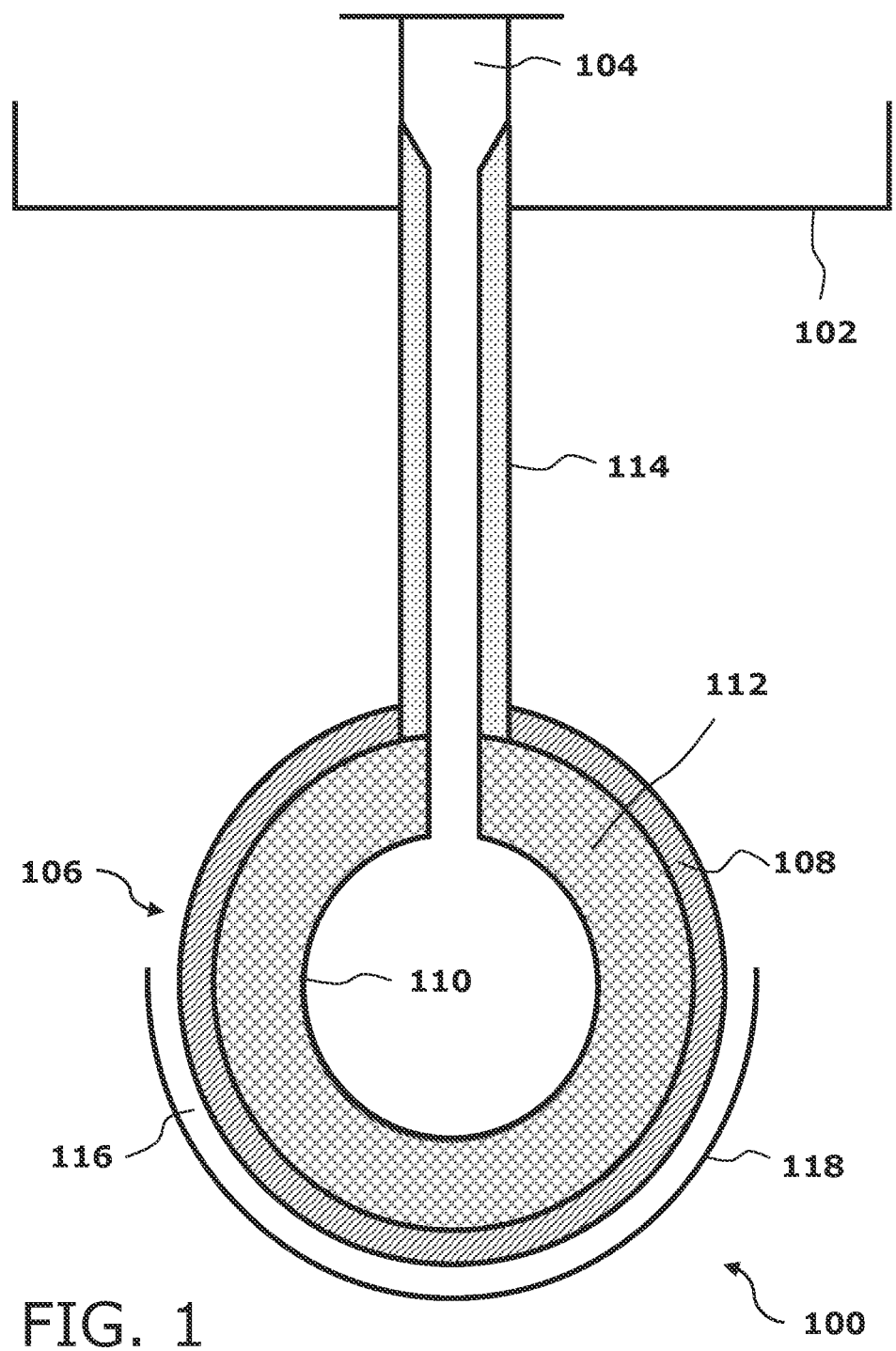
FIG. 1 is a cross-sectional illustration of a product gas manifold system for a steam reformer in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

According to a first aspect, the present disclosure provides a product gas manifold system for a steam reformer, wherein the steam reformer includes a plurality of reformer tubes within a reformer furnace, and wherein the product gas manifold system comprises: (a) a product gas manifold for a synthesis gas produced by steam reforming, arranged outside the reformer furnace and exposed to the environment, comprising an outer jacket tube and a gas-conveying inner tube extending concentrically and coaxially over its entire length, the space between the inner tube and the jacket tube being at least partially filled with a first layer of a first insulating material, (b) a plurality of nozzle tubes arranged along the length of the product gas manifold, each for connecting a reformer tube to the product gas manifold in such a manner that a fluid connection exists between the gas-conveying inner tube and the reformer tube connected thereto, (c) a second layer of a second insulating material disposed around the jacket tube over at least a portion of its circumference and over at least a portion of its length, (d) a curved outer surface outwardly limiting the second layer of the second insulating material, wherein (e) the curved outer surface has a circular arc-shaped or U-shaped profile in the radial direction, open in the direction of the reformer furnace, and following the shape of the jacket tube in the axial direction.

The advantage of the product gas manifold system is that it enables to achieve a more uniform jacket temperature of the product gas manifold system and reduces tensions in the jacket tube which are caused by temperature differences. The product gas manifold system is able to withstand both internal influences such as temperature differences and external influences such as climatic conditions, thereby increasing the life and efficiency of the product gas manifold system. The product gas manifold system with the insulting arrangement avoids different thermal expansions, thereby preventing distortion of the product gas manifold system along its length.

The plurality of nozzle tubes arranged along the length of the product gas manifold system allows a uniform treatment of the synthesis gas produced in the steam reformer in various reformer tubes.

The curved outer surface is arranged such that it protects the product gas manifold on the side opposite to the plurality of nozzle tubes. In this way, the part of the outer jacket tube most remote from the plurality of nozzle tubes that are heated least is protected against wind and draft.

Optionally, the curved outer surface has a circular arc-shaped profile in radial direction and the length of the circular arc is at least 120°, preferably at least 180°, most preferably more than 180° of a full circle. The circular arc shaped profile provides a uniform distance of the curved outer surface to the outer jacket tube wall.

Optionally, fiber mats or self-supporting insulating moldings made of a mineral fiber composite material are used as the second insulating material. The curved outer surface is the outer surface of the fiber mats or insulating moldings.

Optionally, an air layer of a certain layer thickness is used as a second insulating material. The curved outer surface being formed by a curved metal sheet, whereby the air layer of a certain layer thickness is formed as an air gap between the outer side of the jacket tube and the inner side of the metal sheet.

Optionally, the metal sheet has a plurality of holes with fixed geometrical arrangement, fixed size and fixed minimum spacing, thus forming a perforated plate.

Optionally, the length of the circular arc and the geometric arrangement, size and minimum spacing of the holes are determined such that for a given surface temperature of the jacket tube a maximum surface temperature of the perforated plate, i. e. of the outer side of the metal sheet, is not exceeded.

Optionally, for a surface temperature of the jacket tube of at least 100° C. and at most 300° C., a maximum outer surface temperature of the perforated plate of at most 100° C. is not exceeded.

Optionally, at least one, preferably a plurality of holes are designed in such a way that a visual, endoscopic or photographic observation of the surface of the jacket tube is thereby provided.

Optionally, markings for visual, endoscopic or photographic observation of its deformation are provided on the outer surface of the jacket tube.

Optionally, each nozzle tube comprises an outer jacket tube and an inner tube extending concentrically along its entire length, wherein the space between the inner tube and the jacket tube is at least partially filled with a third insulating material. The nozzle tube extends into the outer boundary of the reformer furnace. The third insulating material between the two concentrically arranged tubes prevents the heat conduction to the product gas manifold, and hence the deflection of the product gas manifold is reduced.

Optionally, the inner tubes of the nozzle tubes and/or of the product gas manifold are designed to be gas-permeable so that the respective jacket tube is exposed to the pressure of the synthesis gas. The gas permeability of the inner tube, which the skilled person also refers to as liner, is a consequence of the expansion joints present in the tube, by which the temperature-related material expansions are compensated.

Optionally, the nozzle tubes are arranged on the circumference of the product gas manifold in a straight axial line. The arrangement allows a uniform treatment of the synthesis gas produced in the steam reformer in various reformer tubes.

Optionally, the product gas manifold is arranged horizontally or descending with an angle of at most 10° with respect to the horizontal. This provides a uniform distance of the product gas manifold to the likewise horizontally mounted steam reformer. The assembly of the steam reformer and the product gas manifold system thereby is simplified.

Optionally, the inner tubes of the nozzle tubes are made of metal. According to an embodiment, the nozzle tubes are provided with an external insulation against heat loss. The advantage of the external insulation can be utilized without the jacket tube losing strength to an inadmissible extent due to the increased temperature. The jacket tube of the nozzle tubes may be fabricated of high-temperature steel.

Optionally, the second layer of the second insulating material and/or the curved metal sheet is arranged between the first and the last nozzle tubes, the nozzle tubes being arranged radially centrally in the opening of the circular arc.

Optionally, the second layer of the second insulating material and/or the curved metal sheet is arranged centrally between the first and the last nozzle tube. This arrangement covers the region of the product gas manifold in which the nozzle tubes are located, so that a good effect of the outer surface is achieved, in particular when it is arranged centrally between the first and the last nozzles tube.

Optionally, the second layer of the second insulating material and/or the curved metal sheet is made in multiple parts, the multiple parts being symmetrically arranged between the first and the last nozzle tube.

The curved outer surface thereby can take account of constructional requirements, such as, for example, supports and holders for the product gas manifold. The curved outer surface optionally includes a holder that can be attached for example to the outer jacket tube of the product gas manifold or to a housing of the steam reformer. The holder may be attached for example to the outer jacket tube of the product gas manifold and to the housing of the steam reformer. The design and attachment of the curved outer surface can be adapted to the local circumstances with respect to spatial conditions and wind direction. Optionally, the curved outer surface may be placed such that it preferably protects one of the side faces of the product gas manifold.

Optionally, the outer jacket tube of the product gas manifold is supported by a plurality of bases, at least two of said bases serving as support points and/or attachment points for the second layer of the second insulating material and/or the curved metal sheet.

Optionally, a steam reformer is equipped with the product gas manifold system according to the invention. The steam reformer includes reformer tubes filled with a reforming catalyst, and a plurality of burners arranged between the reformer tubes, for example in the ceiling of a reformer housing. Burners may be provided between tube conduits of the steam reformer for supplying and discharging the processed and waste gases.

Optionally, the steam reformer is used to produce a hydrogen and carbon oxides-containing synthesis gas by steam reforming a hydrocarbon-containing feed gas under steam reforming conditions.

The below tables provides a comparison of heat transfer calculations showing the impact of the product gas manifold system according to the invention for a Steam Methane Reformer (SMR) as compared to conventional product gas manifold system (comparative), The heat transfer calculations suggest that the wall temperatures are reduced to a greater extent with the product gas manifold system having the air gap (90 mm) and the insulating material (25 mm).

| Product gas manifold system without outer curved surface (Comparative) | | Product gas manifold system with air gap 90 mm) (Invention) | | Product gas manifold system (with insulating mat 25 mm) (Invention) | |
|---|---|---|---|---|---|
| Inner | Outer | Inner | Outer | Inner | Outer |
| Temperature 880° C. | 27° C. | Temperature 880° C. | 27° C. | Temperature 880° C. | 27° C. |
| Heat Transfer Coeff. 150 W/m²K | 12.5 W/m²K | Heat Transfer Coeff. 150 W/m²K | 12.5 W/m²K | Heat Transfer Coeff. 150 W/m²K | 12.5 W/m²K |
| Tube dimensions | | | | | |
| ID 500 mm | | ID 500 mm | | ID 500 mm | |
| OD 1040 mm | | OD 1220 mm | | OD 1090 mm | |
| Results | | | | | |
| Wall Temperatures 867° C. | 103° C. | Wall Temperatures 869° C. | 82° C. | Wall Temperatures 870° C. | 84° C. |

-continued

| | Product gas manifold system without outer curved surface (Comparative) | | Product gas manifold system with air gap 90 mm) (Invention) | | Product gas manifold system (with insulating mat 25 mm) (Invention) | |
|---|---|---|---|---|---|---|
| | Inner | Outer | Inner | Outer | Inner | Outer |
| Total heat flux | 1963 W/m² | 944 W/m² | Total heat flux 1677 W/m² | 687 W/m² | Total heat flux 1551 W/m² | 711 W/m² |
| Total insulation thickness | | 270 mm | Total insulation thickness | 360 mm | Total insulation thickness | 295 mm |
| Heat Flux per Meter Tube | | 3083 W/m | Heat Flux per Meter Tube | 2633 W/m | Heat Flux per Meter Tube | 2435 W/m |

FIG. 1 is a cross-sectional illustration of a product gas manifold system 100 for a steam reformer in accordance with an embodiment of the present invention. The product gas manifold system 100 for the steam reformer includes a reformer housing 102 and a reformer tube 104 within a reformer furnace; moreover, the product gas manifold system 100 includes a product gas manifold 106, a first layer of a first insulating material 112, a plurality of nozzle tubes 114, a second layer of a second insulating material 116 and a curved outer surface 118. The product gas manifold 106 includes an outer jacket tube 108 and a gas-conveying inner tube 110 extending concentrically and coaxially over its entire length. A space between the gas-conveying inner tube 110 and the outer jacket tube 108 is at least partially filled with the first layer of a first insulating material 112. The plurality of nozzle tubes 114 is arranged along the length of the product gas manifold 106. Each of the plurality of nozzle tubes 114 is provided for the steam reformer for connecting the reformer tube 104 to the product gas manifold 106 in such a manner that a fluid connection exists between the gas-conveying inner tube 110 and the reformer tube 104. The second layer of the second insulating material 116 is disposed around the outer jacket tube 108 over at least a portion of its circumference and over at least a portion of its length. The curved outer surface 118 outwardly limits the second layer of the second insulating material 116. The curved outer surface 118 has a circular arc-shaped or U-shaped profile in the radial direction and open in the direction of the reformer furnace. The curved outer surface 118 follows the shape of the outer jacket tube 108 in the axial direction, i.e. perpendicular to the drawing plane.

Figure 2:
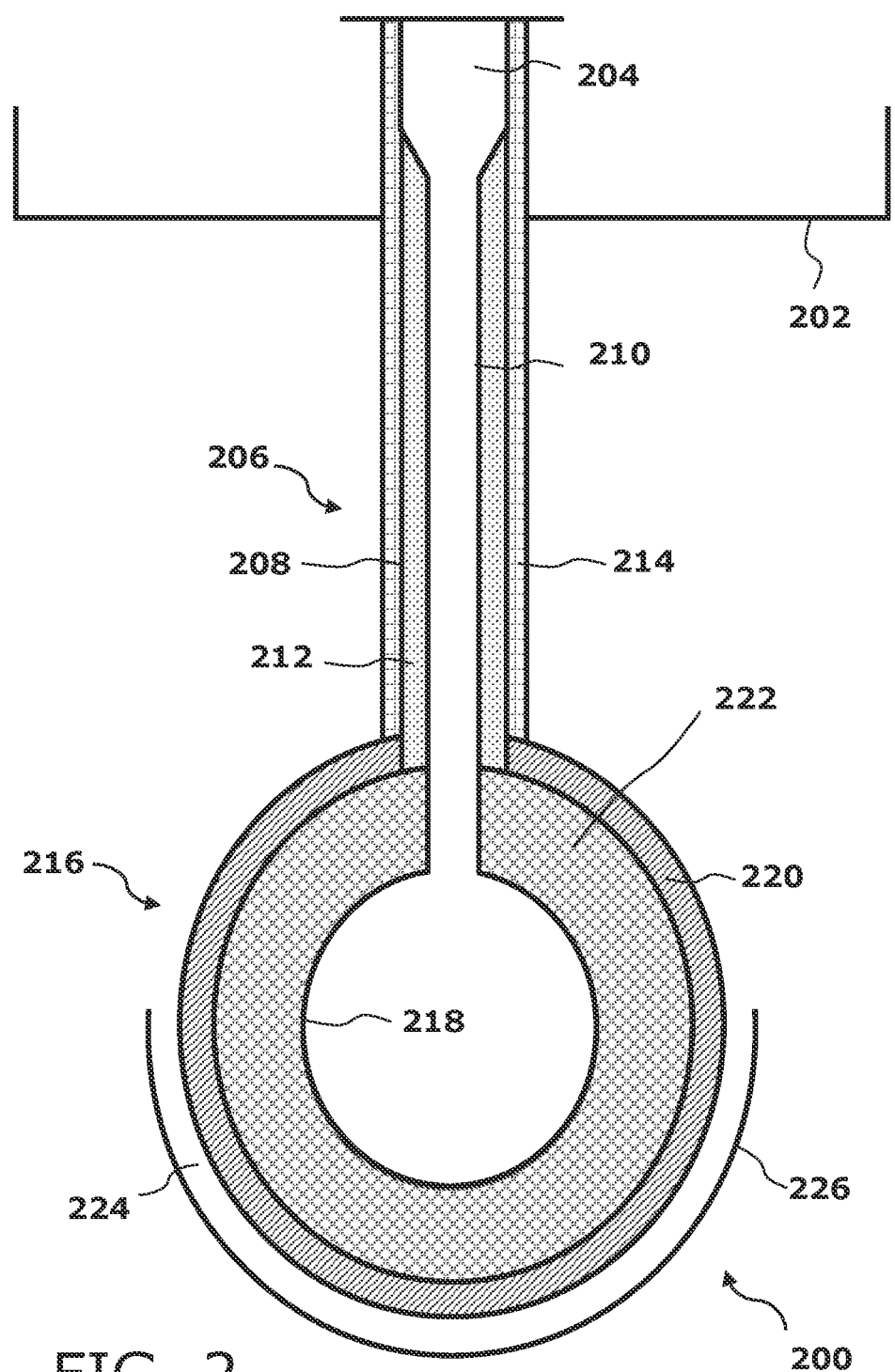
FIG. 2 is a cross-sectional illustration of a nozzle tube with an external insulation of a product gas manifold system for a steam reformer in accordance with an embodiment of the present disclosure.

FIG. 2 is a cross-sectional illustration of a nozzle tube 206 with external insulation 214 of a product gas manifold system 200 for a steam reformer in accordance with an embodiment of the present disclosure. Moreover, FIG. 2 is an illustration of an embodiment, wherein the nozzle tube 206 includes an outer jacket tube 208, an inner tube 210, a third insulating material 212 and the external insulation 214. The outer jacket tube 208 and the inner tube 210 extend concentrically along their entire length and a space between the inner tube 210 and the jacket tube 208 is at least partially filled with the third insulating material 212. The nozzle tube 206 extends into a reformer housing 202 of the steam reformer that forms the outer boundary of reformer furnace. The nozzle tube 206 connects a reformer tube 204 within the reformer furnace to a product gas manifold 216 in such a manner that a fluid connection exists between a gas-conveying inner tube 218 of the product gas manifold 216. The product gas manifold 216 includes an outer jacket tube 220 and the gas-conveying inner tube 218 extending concentrically and coaxially over its entire length. The space between the gas-conveying inner tube 218 and the outer jacket tube 220 is at least partially filled with a first layer of a first insulating material 222. A second layer of a second insulating material 224 is disposed around the outer jacket tube 220 over at least a portion of its circumference and over at least a portion of its length. The second layer of the second insulating material 224 is limited by a curved outer surface 226 that has a circular arc-shaped or U-shaped profile in the radial direction and open in the direction of the reformer furnace. The curved outer surface 226 follows the shape of the outer jacket tube 220 in the axial direction, i.e. perpendicular to the drawing plane.

Figure 3:
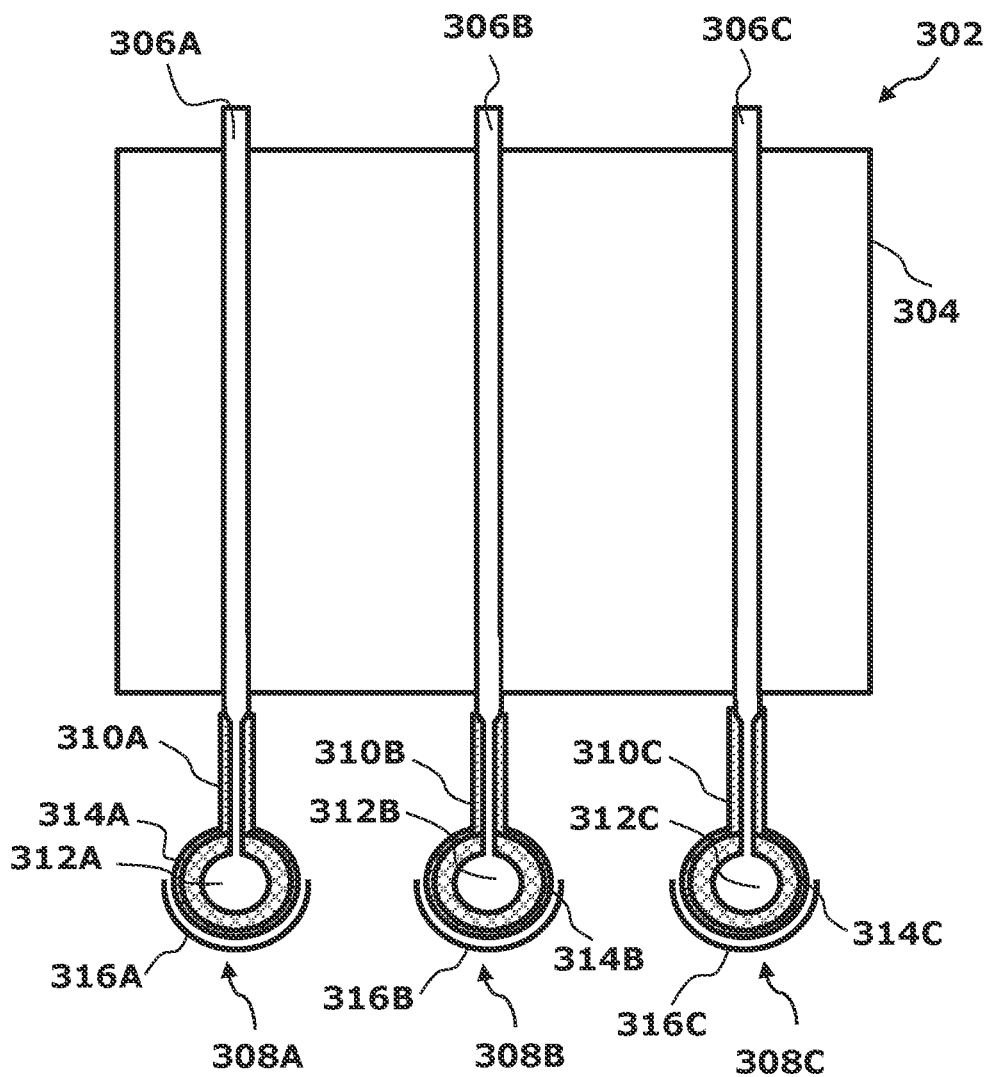
FIG. 3 is a schematic illustration through a steam reformer transversely to its longitudinal axis, equipped with three product gas manifold systems in accordance with an embodiment of the present disclosure.

FIG. 3 is a schematic illustration through a steam reformer 302 transversely to its longitudinal axis, equipped with three product gas manifold systems 308A-C in accordance with an embodiment of the present disclosure. Moreover, FIG. 3 is an illustration of an embodiment, wherein the steam reformer 302 is equipped with three reformer tubes 306A-C. The steam reformer 302 includes a reformer housing 304. The steam reformer 302 includes a first reformer tube 306A, a second reformer tube 306B, and a third reformer tube 306C. The first, second, third reformer tubes 306A-C are provided within a reformer furnace. A first nozzle tube 310A of the first product gas manifold system 308A, a second nozzle tube 310B of the second product gas manifold system 308B, and a third nozzle tube 310C of the third product gas manifold system 308C connects the respective first reformer tube 306A, the second reformer tube 306B and the third reformer tube 306C in such a manner that a fluid connection exists between a corresponding first gas-conveying inner tube 312A of the first product gas manifold system 308A, a second gas-conveying inner tube 312B of the second product gas manifold system 308B, a third gas-conveying inner tube 312C of the third product gas manifold system 308C. The first, second and third product gas manifold systems 308A-C includes a first, second, third outer jacket tubes 314A-C and the first, second and the third gas-conveying inner tubes 312A-C extending concentrically and coaxially over its entire length. According to an embodiment of the invention, curved outer surfaces 316A-C with a circular arc-shaped or U-shaped profile in the radial direction and open in the direction of the reformer furnace are arranged around the outer jacket tubes 314A-C.

Figure 4:
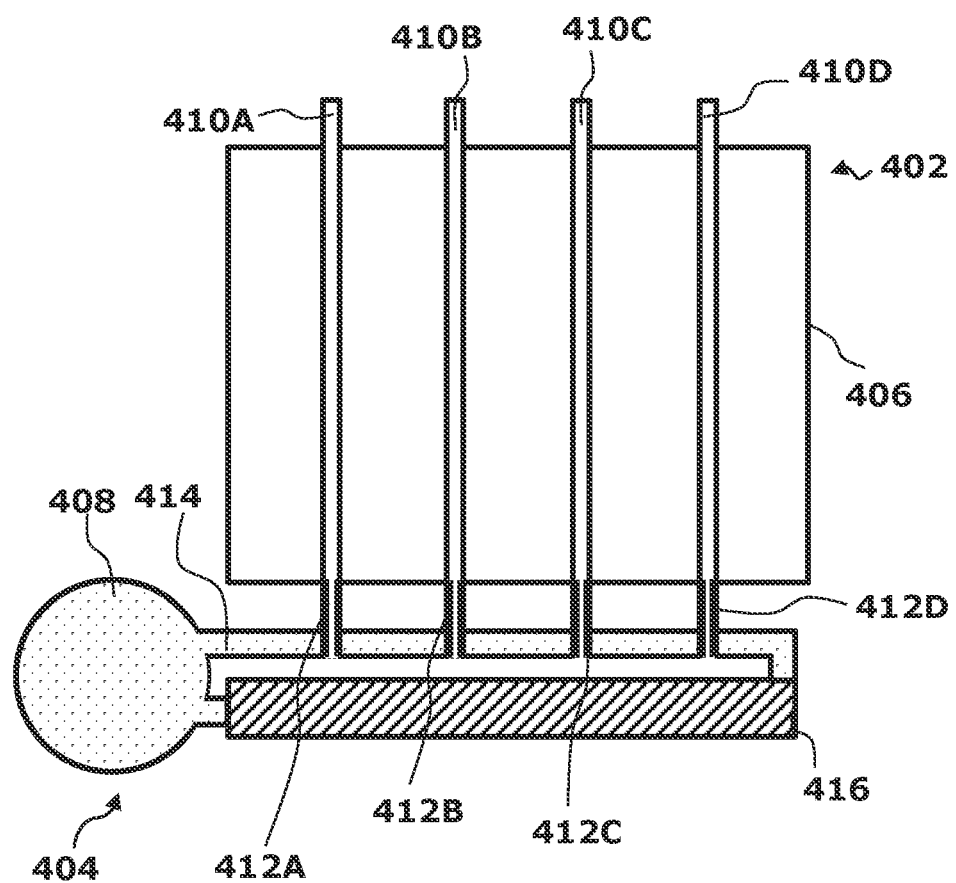
FIG. 4 is a schematic illustration of a longitudinal section through a steam reformer and through a product gas manifold system with a curved outer surface arranged between first nozzle tube and last nozzle tube.

FIG. 4 is a schematic illustration of a longitudinal section through a steam reformer 402 and through a product gas manifold system 404 with a curved outer surface 416 arranged between first nozzle tube and last nozzle tube. Moreover, FIG. 4 is an illustration of an embodiment, wherein the steam reformer 402 includes a reformer housing 406 comprising a first reformer tube 410A, a second reformer tube 410B, a third reformer tube 410C, and a fourth reformer tube 410D. The first reformer tube, the second reformer tube, the third reformer tube, and the fourth reformer tube 410A-D are provided within a reformer furnace. The product gas manifold system 404 is connected to the first reformer tube 410A, the second reformer tube 410B, the third reformer tube 410C, and the fourth reformer tube 410D of the steam reformer 402 through a first nozzle tube 412A, a second nozzle tube 412B, a third nozzle tube 412C and the fourth nozzle tube 4120 respectively. The first, second, third and the fourth nozzle tubes 412A-D connect the corresponding first, second, third and the fourth reformer tubes 410A-D in such a manner that a fluid connection exists between a gas-conveying inner tube 414 of a traversely extending product gas manifold 408. The curved outer surface 416 is provided to cover the bottom half of the product gas manifold 408. The curved outer surface 416 has a circular arc-shaped or U-shaped profile in the radial direction and open in the direction of the reformer furnace.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A product gas manifold system for a steam reformer, wherein the steam reformer includes a plurality of reformer tubes within a reformer furnace, and wherein the product gas manifold system comprises:
    (a) a product gas manifold for a synthesis gas produced by steam reforming, arranged outside the reformer furnace and exposed to ambient environment, comprising an outer jacket tube and a gas-conveying inner tube extending concentrically and coaxially over its entire length, the space between the inner tube and the jacket tube being at least partially filled with a first layer of a first insulating material
    (b) a plurality of nozzle tubes arranged along a length of the product gas manifold, each for connecting a reformer tube to the product gas manifold in such a manner that a fluid connection exists between the gas-conveying inner tube and the reformer tube connected thereto,
    (c) a second layer of a second insulating material disposed around the jacket tube over at least a portion of a circumference and over at least a portion of a length,
    (d) a curved outer surface outwardly limiting the second layer of the second insulating material, wherein
    (e) the curved outer surface has a circular arc-shaped or U-shaped profile in the radial direction, open in the direction of the reformer furnace, and following the shape of the jacket tube in the axial direction,
    wherein fiber mats or self-supporting insulating moldings made of a mineral fiber composite material are used as the second insulating material, the curved outer surface being the outer surface of the fiber mats or insulating moldings, or wherein an air layer is used as a second insulating material, the curved outer surface being formed by a curved metal sheet, whereby the air layer is formed as an air gap between the outer side of the jacket tube and the inner side of the metal sheet.

2. A product gas manifold system according to claim 1, wherein the curved outer surface has a circular arc-shaped profile in radial direction and the length of the circular arc is at least 120°.

3. A product gas manifold system according to claim 1, wherein the metal sheet has a plurality of holes with fixed geometrical arrangement, fixed size and fixed minimum spacing.

4. A product gas manifold system according to claim 3, wherein the length of the circular arc and the geometric arrangement, size and minimum spacing of the holes are determined such that for a given surface temperature of the jacket tube a maximum surface temperature of the perforated plate is not exceeded.

5. A product gas manifold system according to claim 4, wherein for a surface temperature of the jacket tube of at least 100° C. and at most 300° C., a maximum outer surface temperature of the perforated plate of at most 100° C. is not exceeded.

6. A product gas manifold system according to claim 3, wherein at least one hole is designed in such a way that a visual, endoscopic or photographic observation of the surface of the jacket tube is thereby provided.

7. A product gas manifold system according to claim 6, wherein markings for visual, endoscopic or photographic observation of its deformation are provided on the outer surface of the jacket tube.

8. A product gas manifold system according to claim 1, wherein each nozzle tube comprises an outer jacket tube and an inner tube extending concentrically along an entire length, wherein the space between the inner tube and the jacket tube is at least partially filled with a third insulating material, and wherein the nozzle tube extends into the outer boundary of the reformer furnace.

9. A product gas manifold system according to claim 1, wherein the inner tubes of the nozzle tubes and/or of the product gas manifold are designed to be gas-permeable so that the respective jacket tube is exposed to the pressure of the synthesis gas.

10. A product gas manifold system according to claim 1, wherein the nozzle tubes are arranged on a circumference of the product gas manifold in a straight axial line.

11. A product gas manifold system according to claim 1, wherein the product gas manifold is arranged horizontally or descending with an angle of at most 10° with respect to the horizontal.

12. A product gas manifold system according to claim 1, wherein the inner tubes of the nozzle tubes are made of metal.

13. A product gas manifold system according to claim 1, wherein the nozzle tubes are provided with an external insulation against heat loss.

14. A product gas manifold system according to claim 1, wherein the second layer of the second insulating material and/or the curved metal sheet is arranged between the first and the last nozzle tubes, the nozzle tubes being arranged radially centrally in the opening of the circular arc.

15. A product gas manifold system according to claim 1, wherein the second layer of the second insulating material and/or the curved metal sheet is arranged centrally between the first and the last nozzle tube.

16. A product gas manifold system according to claim 1, wherein the second layer of the second insulating material and/or the curved metal sheet is made in multiple parts, the multiple parts being symmetrically arranged between the first and the last nozzle tube.

17. A product gas manifold system according to claim 1, wherein the outer jacket tube of the product gas manifold is supported by a plurality of bases, at least two of the bases serving as support points and/or attachment points for the second layer of the second insulating material and/or a curved metal sheet.

18. Steam reformer equipped with a product gas manifold system according to claim 1.

* * * * *